United States Patent
Kakish et al.

(10) Patent No.: US 9,310,838 B2
(45) Date of Patent: Apr. 12, 2016

(54) POWER MANAGEMENT METHOD FOR SWITCHING POWER MODE OF A COMPUTER SYSTEM BASED ON DETECTION OF A HUMAN INTERFACE DEVICE

(75) Inventors: Musa Ibrahim Kakish, Anaheim, CA (US); Ping-Shun Zeung, Taipei County (TW); Johnny Hsiang-Yu Chen, Anaheim, CA (US)

(73) Assignee: I/O INTERCONNECT, LTD., Santa Ana, CA (US)

( * ) Notice: Subject to any disclaimer, the term of this patent is extended or adjusted under 35 U.S.C. 154(b) by 541 days.

(21) Appl. No.: 12/727,259

(22) Filed: Mar. 19, 2010

(65) Prior Publication Data

US 2011/0231682 A1    Sep. 22, 2011

(51) Int. Cl.
  *G06F 1/32* (2006.01)
  *G06F 1/00* (2006.01)
  *G06F 1/16* (2006.01)

(52) U.S. Cl.
  CPC .......... *G06F 1/1632* (2013.01); *G06F 1/3203* (2013.01); *G06F 1/3215* (2013.01)

(58) Field of Classification Search
  CPC .................................................. G06F 1/3203
  USPC ...................................................... 713/320
  See application file for complete search history.

(56) References Cited

U.S. PATENT DOCUMENTS

| | | | | |
|---|---|---|---|---|
| 5,832,285 A * | 11/1998 | Shimada | ........................ | 713/323 |
| 6,215,764 B1 * | 4/2001 | Wey et al. | ..................... | 370/216 |
| 6,216,187 B1 * | 4/2001 | Truong | ........................ | 710/304 |
| 7,046,276 B2 * | 5/2006 | Hashimoto et al. | ........ | 348/220.1 |
| 7,159,766 B2 * | 1/2007 | Wurzburg et al. | ............ | 235/376 |
| 7,328,333 B2 * | 2/2008 | Kawano et al. | .................... | 713/1 |
| 7,333,785 B1 * | 2/2008 | Lavelle et al. | ............. | 455/127.5 |
| 7,565,561 B2 * | 7/2009 | Yanagawa | ..................... | 713/323 |
| 8,046,613 B2 * | 10/2011 | Enami et al. | .................. | 713/320 |
| 2006/0271802 A1 * | 11/2006 | Yanagawa | ..................... | 713/300 |
| 2009/0125732 A1 * | 5/2009 | Oya et al. | ...................... | 713/300 |

\* cited by examiner

*Primary Examiner* — Suresh Suryawanshi

(57) ABSTRACT

A power management method is disclosed. The power management method comprises the step of a computer system checking existence of a manufacturing identifier (ID) of a human interface device (HID) when the computer system is operated in a first mode; the computer system continuously detecting whether the HID exist when the manufacturing ID exists; the computer system starting a timer when the computer system detects that the HID does not exist; the computer system entering a second mode when the timer expires; the HID determining whether the computer system is operated in the second mode, when plugged into the computer system; the HID performing state transition on the computer system when determining that the computer system is in the second mode; and the computer system entering the first mode when detecting the state transition.

13 Claims, 5 Drawing Sheets

POWER MANAGEMENT METHOD FOR SWITCHING POWER MODE OF A COMPUTER SYSTEM BASED ON DETECTION OF A HUMAN INTERFACE DEVICE

BACKGROUND OF THE INVENTION

1. Field of the Invention

The present invention relates to a power management method and related power management system, and more particularly, to a power management method for switching a power mode of a computer system and related power management system.

2. Description of the Prior Art

Universal serial bus (USB) was developed to define an external expansion bus which facilitates the connection of additional peripherals to a computer system. The USB technique is implemented by personal computer (PC) host controller hardware and software and by peripheral friendly master-slave protocols and achieves robust connections and cable assemblies, which USB systems are extendable through multi-port USB dock station.

In USB systems, the role of the system software is to provide a uniformed view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

The USB dock station is incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implement in the USB specifications (e.g. USB 1.1 or USB 2.0 specifications), this technique was still improved in order to provide a higher performance interface. Please refer to FIG. 1, which illustrates a software and hardware of a USB system 10. The system components can be organized hierarchically by defining several layers as shown in FIG. 1. The USB system 10 comprises a client software 100, a USB driver 120, a host controller driver 140, a host controller 160 and a USB device 180. The client software 100 executes on the PC and corresponds to the particular USB device 180. The client software 100 is part of an operating system (OS) of the PC, or provided with the USB device 180. The USB driver 120 is a system software bus driver that abstracts the details of the particular host controller driver 140 for the OS. The host controller driver 140 provides a software layer between the host controller 160 and the USB driver 120 as a driver-hardware interface.

While the layers discussed so far are software implemented, the uppermost hardware component layer comprises the host controller 160 and the USB device 180. The host controller 160 is compliant to a specific USB host controller interface specification. The host controller 160 is connected to the USB device 180 that performs the end user function. In some examples, the host controller 160 is an enhanced host controller (EHC) for the high speed USB 2.0 functionality. In some examples, the host controller 160 is universal host controller (UHC) or open host controller (OHC) for providing USB 1.1 functionality.

Referring to FIG. 2, hardware components of a computer system 20 are depicted. The computer system 20 may be a portable computer system (e.g. laptop). The computer system 20 includes a central processing unit (CPU) 200, a north bridge 210, a main memory 220, a graphic controller 230, a peripheral component interconnect (PCI) bus 240, a south bridge 250, a USB bus 260, a USB port 270 and a USB device 280. The north bridge 210 usually is a single chip in a core logic chipset that connects the CPU 200 to the main memory 220 and the graphic controller 230 and the PCI bus 240. The PCI bus 240 is commonly used in personal computers for providing a data path between the CPU 200 and peripheral devices like video cards, sound cards, network interface cards and modems. It is to be noted that other computer system may have no north bridge in it, or that have a north bridge without the graphic controller or PCI options.

The south bridge 250 is usually the chip in a system core-logic chipset that controls the USB bus 260 that provides plug-and-play support, manages the keyboard mouse controller, provides power management features, and controls other peripherals. In some examples, the south bridge 250 comprises the host controller 251 to communicate through the USB port 270 with the USB device 280. The USB port 270 and the USB device 280 are internal or external to the computer system 10. In some examples, the USB device 280 is referred as to a USB dock station, which provides multiple USB ports for additional connectivity for USB peripherals.

Generally, the USB device attached to the computer system may prevent the CPU from entering a low power mode (e.g. suspend to ram (STR) mode). The prior art may work well for getting the computer system from the low power mode back into the normal mode through sideband signals. The related US patent application no. US 2005/0160196A1 describes a computer system that includes a computer controller to send and/or receive sideband signals to/from a USB device. In this patent, the USB device includes a USB controller to send/receive sideband signals to/from the computer controller. The computer controller and USB controller allows communications between the computer system and the USB devices when either of the computer system or USB device is the low power mode. The sideband signals sent between the computer system and the USB devices trigger the other of the computer system or the USB device to enter the normal mode.

As known, the prior art uses the sideband signals as the medium to wake up the computer system. However, more hardware implementation must be done for detection and generation of the sideband signals. Consequently, this may lead to more complexities and prohibitive cost.

SUMMARY OF THE INVENTION

It is thereof an objective of the present invention to provide a power management method for switching the computer system between system modes associated with power utilization.

The present invention discloses a power management method. The power management method comprises the step of a computer system checking existence of a manufacturing identifier (ID) of a human interface device (HID) when the computer system is operated in a first mode; the computer system continuously detecting whether the HID exist when the manufacturing ID exists; the computer system starting a timer when the computer system detects that the HID does not exist; the computer system entering a second mode when the timer expires; the HID determining whether the computer system is operated in the second mode, when plugged into the computer system; the HID performing state transition on the computer system when determining that the computer system is in the second mode; and the computer system entering the first mode when detecting the state transition.

The present invention further discloses a power management method for a computer system. The power management method comprises the step of checking existence of a manufacturing identifier (ID) of a human interface device (HID) when the computer system is operated in a first mode; continuously detecting whether the HID exists when the manufacturing ID exists; starting a timer when detecting that the HID does not exist; and entering a second mode when the timer expires.

The present invention further discloses a power management method for a human interface device (HID). The power management method comprises the step of when plugged into a computer system, determining whether the computer system is operated in the second mode; and performing state transition on the computer system when determining that the computer system is in the second mode, wherein the state transition operates the computer system into the first mode.

The present invention further comprises a power management system for a computer system. The power management system comprises a human interface device (HID), an application unit and a power switching unit. The HID is used for triggering a mode switching of the computer system from a second mode to a first mode, and comprises a power switching unit and a control unit. When the HID is plugged into the computer system, the first detection unit is used for determining whether the computer system is operated in the second mode. The control unit is used for performing state transition on the computer system when determining that the computer system is in the second mode. The application unit is installed in the computer system, and used for triggering the mode switching of the computer system from the first mode to the second mode. The application unit comprises a timer and a second detection unit. The second detection unit is used for checking existence of a manufacturing identifier (ID) of the HID when the computer system is operated in a first mode and continuously detecting whether the HID exist when the manufacturing ID exists. The power switching unit is used for switching the computer system from the first mode to the second mode when the timer expires, and switching the computer from the second mode to the first mode when detecting the state transition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
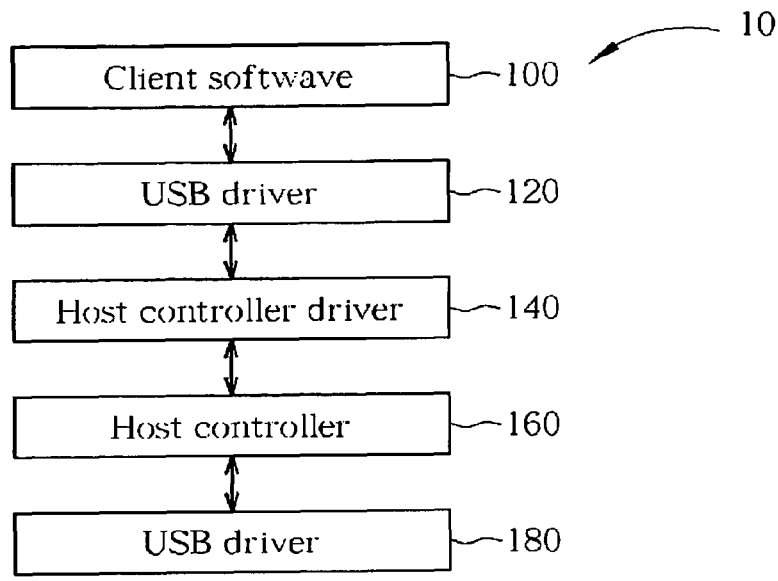
FIG. 1 illustrates a software and hardware of a USB system in the prior art.
Figure 2:
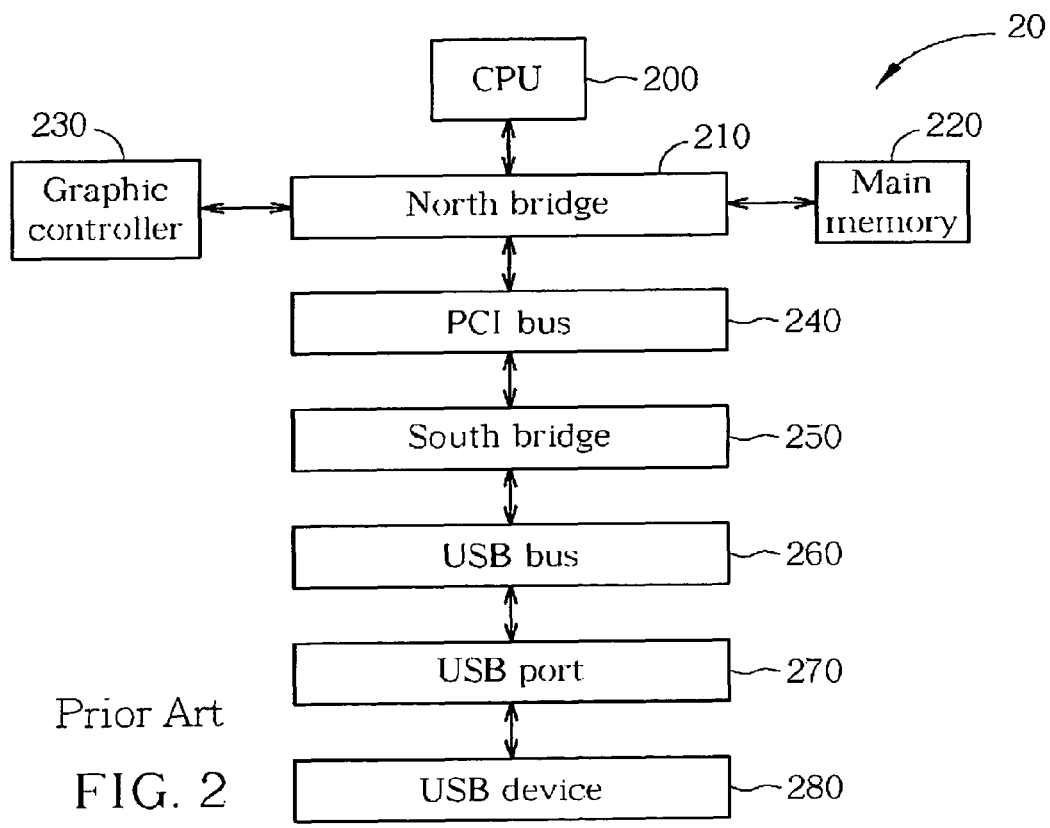
FIG. 2 illustrates hardware components of a computer system in the prior art.
Figure 3:
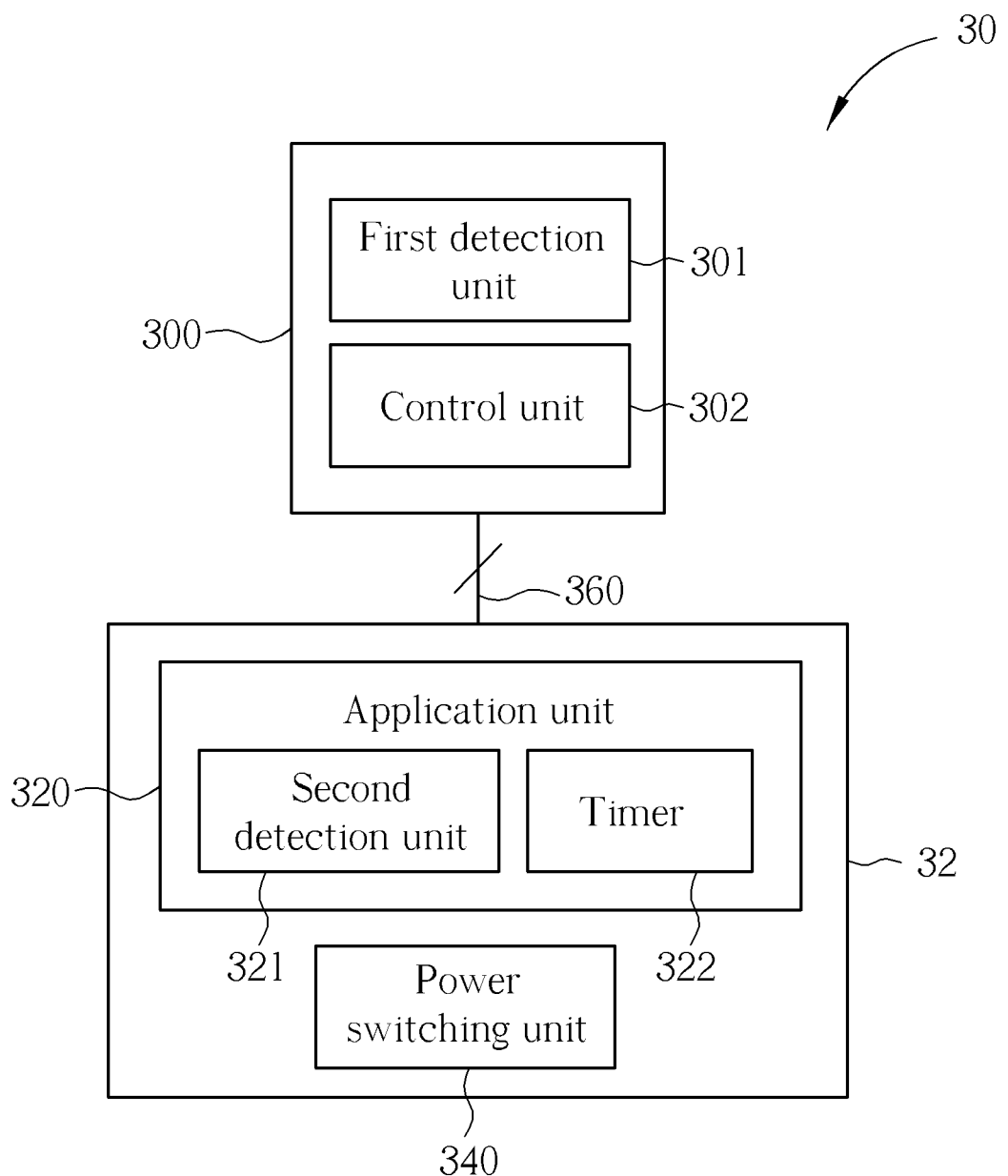
FIG. 3 illustrates a power management system according to an example.

Please refer to FIG. 3, which illustrates a power management system 30 according to an example. The power management system 30 may be applied to a computer system 32. The computer system can be operated in a mode M1 and a mode M2. The power management system 30 is used for switching the computer system 32 between the modes M1 and M2 for power-saving purpose. The modes M1-M2 can control the computer system 32 to operate in different power degrees and may be a standby mode, full-power mode, low power mode, sleep mode, etc. The computer system 32 may be, but is not limited to, a digital camera, a personal assistant (PDA), a smart phone, a personal computer (PC), a laptop/desktop, a digital video device, and a portable audio device. The power management 30 includes a human interface device (HID) 300, an application unit 320, a power switching unit 340, and a data bus 360. The data bus 360 is used for communicating the HID 300 with the computer system 32. The data bus 360 may be referred as to a USB bus. The USB bus is responsible for conveying data between a particular USB device and a USB host controller and comprises two data lines (D+ line and D− line). Some special terminologies may be used on the D+ line and D− line. Based on the terminologies, different states of D+ line and D− line are defined. For example, a J state may be represented by one of D+ line and D− line remains high and the other line goes low. A K state is opposite the J state. USB data could be transmitted by toggling the data lines between the J state and the opposite K state. A 0 bit is transmitted by toggling the data lines from J to K or vice-versa, while a 1 bit is transmitted by leaving the data lines as-is. The power switching unit 340 is used for switching the computer system 32 between the modes M1 and M2. In some examples, the power switching unit 340 may be compliant to advanced configuration and power interface (ACPI) specification and may be implemented by an operating system-directed configuration and power management (OSPM). The HID 300 is used for triggering a mode switching of the computer system 32 from the mode M2 to the mode M1. In some examples, the HID 300 may be referred as to a USB dock station for providing additional connectivity to USB peripherals. In some examples, the HID 300 may be referred as to a specific USB peripheral, such as a keyboard, a mouse, a printer, a flash-memory stick, an external drive, a portable audio player, and a digital still camera (DSC). In some examples, the mode M1 may be referred as to an operational mode, or sometimes called working mode or a S0 mode. When the computer system 32 is operated in the operational mode, the computer system 32 is on; the central process unit (CPU) is fully up and running; power conservation operates on a per-device basis. In some examples, the mode M2 may be referred as to a power-saving mode, or sometimes called a low power mode, a sleep mode, a standby mode, or a S3 mode. When the computer is operated in the power-saving mode, the computer system 32 appears off; the CPU has no power; random access memory (RAM) is in slow refresh; the power supply is in a reduced power mode. Certainly, there are other modes defined in the ACPI specification. Those modes may be selected as possible options for the mode M1 and the mode M2. The mode operation and the number of mode may be determined according to the system requirement, and the modes M1 and M2 are provided herein as example, not a scope limitation.

Turning now back to FIG. 3, the HID 300 includes a first detection unit 301, and a control unit 302. The first detection unit 301 and the control unit 302 may be carried out by a hardware circuit or a firmware in the HID 300. The first detection unit 301 is used for determining whether the computer system 32 is operated in the mode M2 when the HID 300 is plugged into the computer system. The control unit 302 is used for performing state transition on the computer system 32 when the HID 300 determines that the computer system 32 is in the mode M2. When the computer system 32 is operated in the mode M2 used as the power-saving mode, the first detection unit may detect a bus activity on the data bus 360 (i.e. D+ line and D− line) for a predetermine time T1. If no bus activity is detected on the data bus 360 during the predetermined time T1, the first detection unit may ensure that the computer system 32 is operated in the mode M2. If any bus activity is detected during the predetermined time T1, the first detection unit may assume that the computer system 32 may switch to the mode M1 already, and the HID 300 may do nothing involved with the mode switching of the computer system 32. In some examples, the predetermined time T1 is greater than 15 micro second (ms).

Once no bus activity has been detected during the first predetermined time T1, the control unit 302 performs the state transition on the data bus 360 to wake up the computer system 32. In some examples, the control unit 302 may force the data bus 360 in the aforementioned J state and then force the data bus 360 in the aforementioned K state. When the data bus 360 is in the K state, the control unit 302 may wait for a predetermined time T2. That is, the data bus 360 may hold in the K state for the predetermined time T2. Finally, the data bus 360 may enter a no-force state which triggers the computer system 32 to enter the mode M1. As a result, through the state transition, the control unit 302 can automatically wake up the computer system 32. In some examples, the predetermined time T2 may be set to 20 micro second (ms). When the computer system 32 detects the state transition performed by the control unit 302, the power switching unit 340 may automatically switch the computer system 32 from the mode M2 to the mode M1.

Turning now back to FIG. 3, the application unit 320 is installed in the computer system 32 and used for triggering the mode switching of the computer system 32 from the mode M1 to the mode M2. The application unit 320 executes on the computer system 32 and corresponds to the HID 300. The application unit 320 may include a timer 321, and a second detection unit 322. When the computer system 32 is operated in the mode M1, the second detection unit 322 may check existence of a manufacturing identifier (ID) of the HID 300. The manufacturing ID sometimes is called a vender ID (VID) or a product ID (PID), which is unique and corresponds to a particular USB device. Therefore, the second detection unit 322 may determine if the HID 300 is attached to the computer system 32 according to the specific manufacturing ID. Namely, the second detection unit 322 may determine that HID 300 is not attached to the computer system 32 when the manufacturing ID of the HID 300 does not exist. When the second detection unit 322 finds that the specific manufacturing ID associated with the HID 300 exists, the second detection unit 322 may determine that the HID 300 is attached to the computer system 32 and further continuously monitor the existence of the HID 300. When the absence of the HID 300 is detected, the timer 321 may be activated. When the timer 321 expires, the power switching unit 340 may switch the computer system 32 from the mode M1 to the mode M2.

Figure 4:
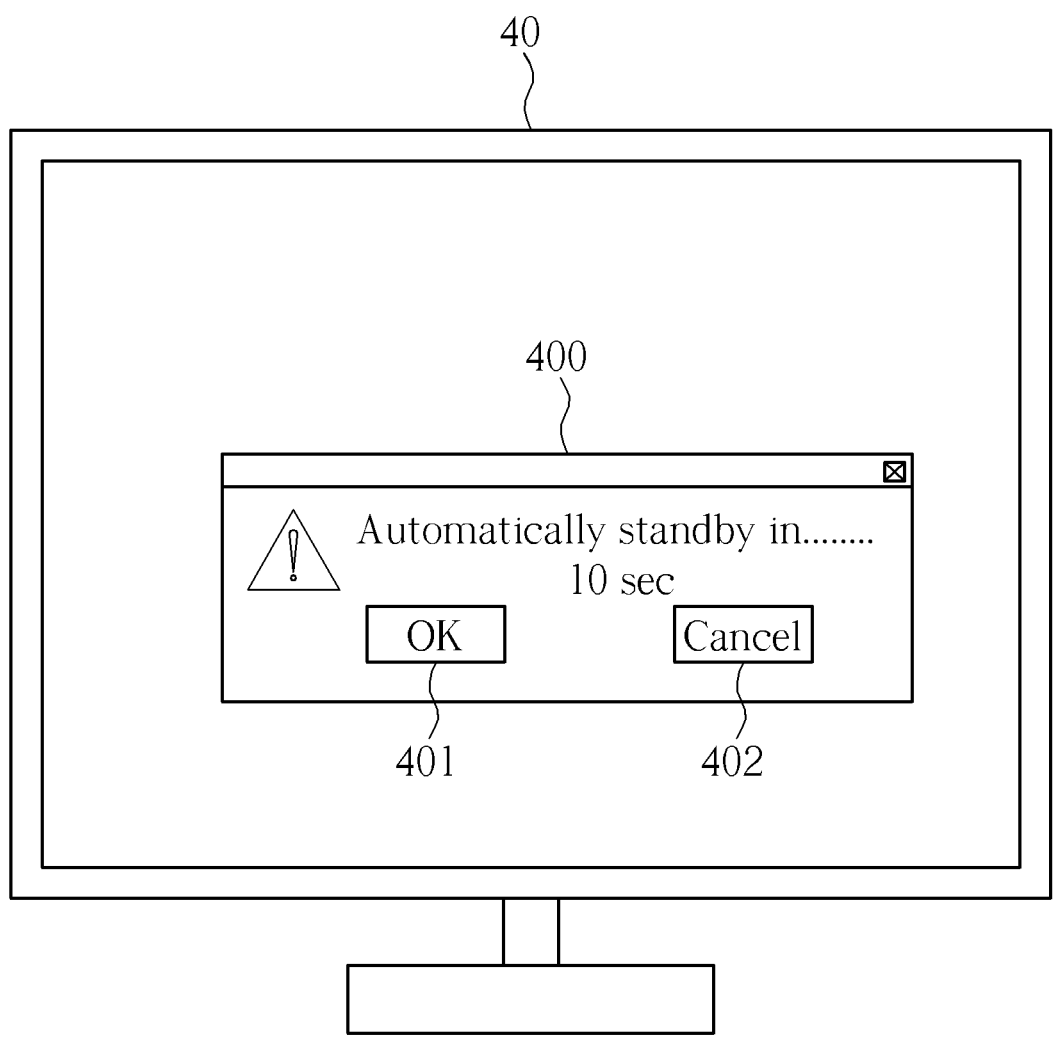
FIG. 4 illustrates a message window popped up on a screen of a computer system according to an example.

In some example, the application unit 320 may pop up a message window on a screen of the computer system. The message window may indicate to a user that the computer system 32 may enter the mode M2. The timer 321 may be disabled according to a feedback signal of the message window, thereby preventing the computer system 32 from entering the mode M2. Taking an example, FIG. 4 illustrates a message window 400 popped up on a screen 40 of a computer system. The message window 400 is showing a message "automatically standby . . . " and a timer starts running, counting down from 10. The message window 400 includes two buttons, a button 401 and a button 402. A user may click the button 401 and thereby a feedback signal triggers the computer system 32 to enter a standby mode is generated. Or the user may click the button 402 and thereby another feedback signal disables the timer and prevents the computer from entering the standby mode. If the user neither clicks the button 401 nor the button 402, the computer system 32 may enter the standby mode automatically when the timer expires.

Briefly, the example may take advantage of the hardware and the software to switch the computer system between different modes. In view of the hardware, the HID 300 may determine whether the computer system 32 is operated in the mode M2 by detecting the bus activity on the data bus 360 of the HID 300 when the HID 300 is plugged in the computer system. If the computer system 32 is operated in the mode M2, the HID 300 may perform the state transition on the data bus 360 to trigger the mode switching of the computer system, and the computer system 32 may enter the mode M1. In view of the software, the application unit 320 can detect whether the manufacturing ID of the HID 300 exist when the computer system 32 is operated in the mode M1. If the manufacturing ID exists, the application unit may determine that the HID 300 is attached to the computer system 32 and continuously monitor the existence of the HID 300. Once the HID 300 is detached, the application unit 320 may start the timer. When the timer expires, the computer system 32 may enter the mode M2. Consequently, the computer system 32 may rapidly switch between different modes (e.g. waking up from the power-saving mode without any inputs from the user or entering the power-saving mode automatically) according to abovementioned examples. Compared with the prior art, the examples of the present invention do not need any extra-hardware circuit to detect/generate sideband signals for a wake-up process. Thus, the complexity and cost can be dramatically reduced.

Figure 5A:
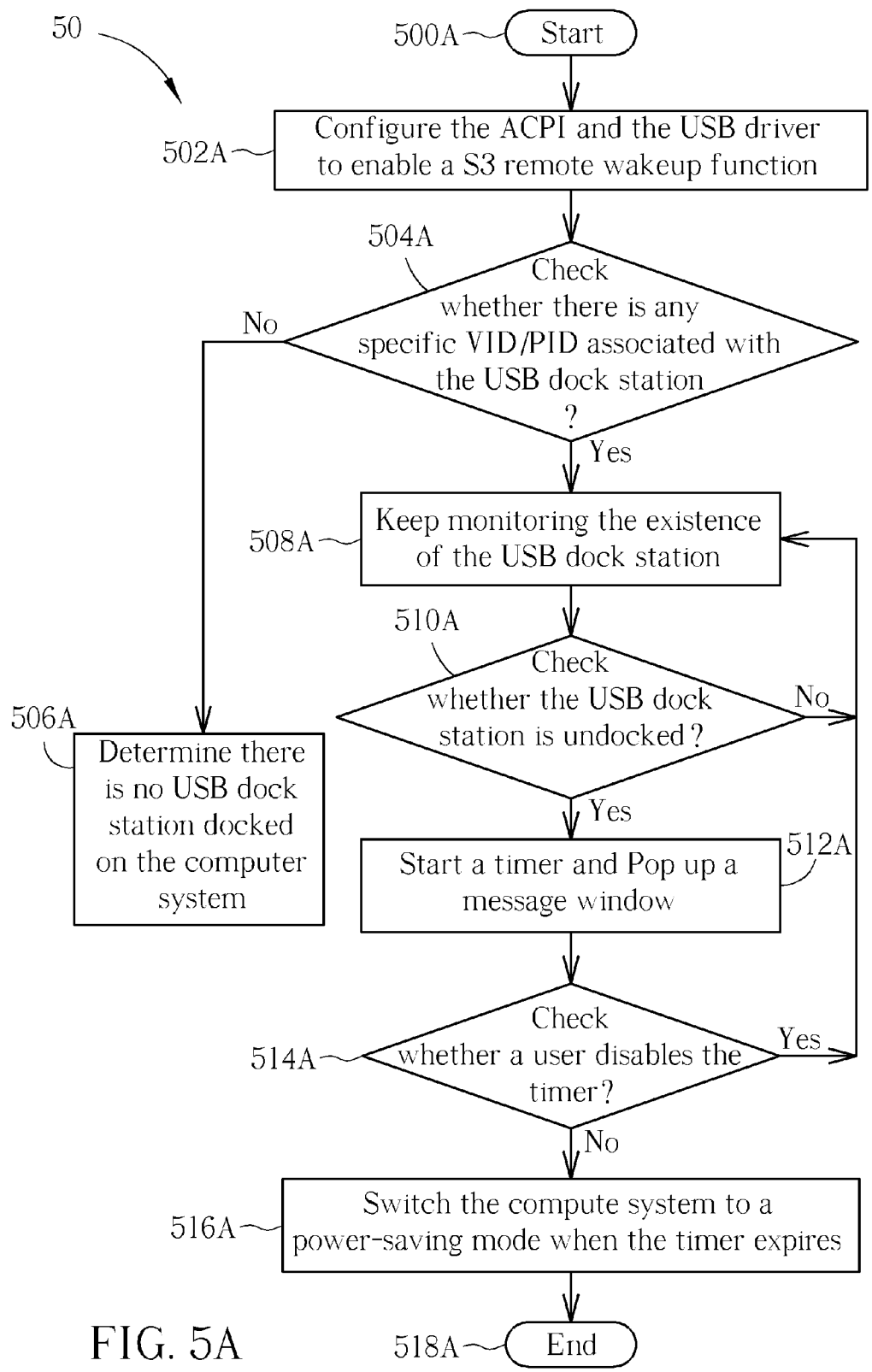
FIGS. 5A and 5B are flowcharts of a process according to an example of the present invention.
Figure 5B:
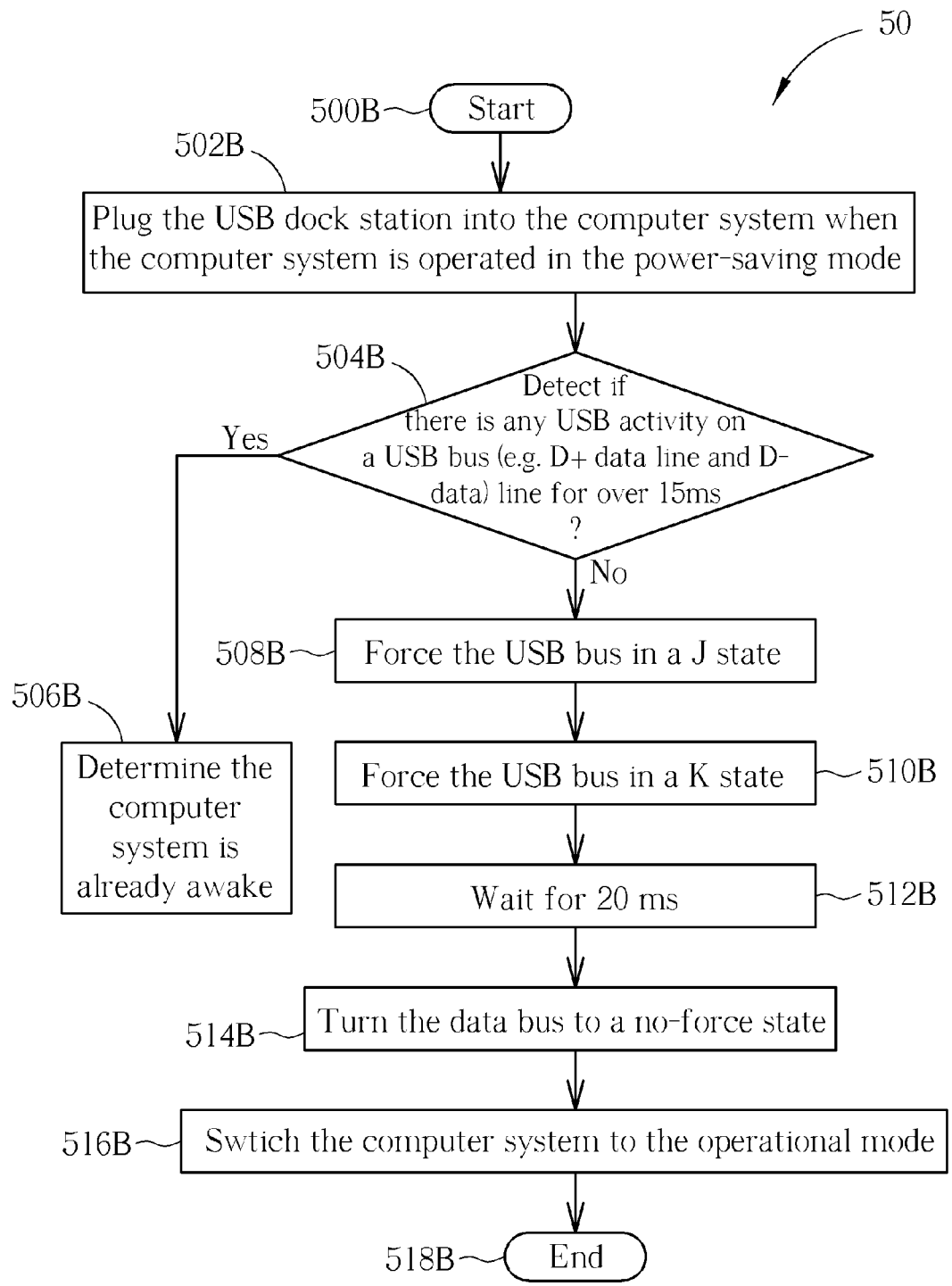

Please refer to FIGS. 5A and 5B, which are flowcharts of a process 50 according to an example of the present invention. The process 50 is used for power management of a computer system. Through the process 50, a computer may enter a power-saving mode or wake up from the power-saving mode. The steps shown in FIG. 5A may be applied to a USB dock station and the steps shown in FIG. 5B may be applied to application software, which corresponds to the USB dock station. The process 50 includes the following steps:

Step 500A: Start.

Step 502A: Configure the ACPI and the USB driver to enable a S3 remote wakeup function.

Step 504A: Check whether there is any specific VID/PID associated with the USB dock station. If so, go to Step 506A; otherwise, go to Step 504A.

Step 506A: Determine there is no USB dock station docked on the computer system.

Step 508A: Keep monitoring the existence of the USB dock station.

Step 510A: Check whether the USB dock station is undocked. If so, go to Step 510A; otherwise, go to Step 506A.

Step 512A: Start a timer and Pop up a message window.

Step 514A: Check whether a user disables the timer. If so, go to Step 506A; otherwise go to Step 514A.

Step 516A: Switch the compute system to a power-saving mode when the timer expires.

Step 518A: End.

Step 500B: Start.

Step 502B: Plug the USB dock station into the computer system when the computer system is operated in the power-saving mode.

Step 504B: Detect if there is any USB activity on a USB bus (e.g. D+ data line and D– data) line for over 15 ms. If so, go to Step 506B; otherwise go to Step 508B.

Step 506B: Determine the computer system is already awake.

Step 508B: Force the USB bus in a J state.

Step 510B: Force the USB bus in a K state.

Step 512B: Wait for 20 ms.

Step 514B: Turn the USB bus to a no-force state.

Step 516B: Switch the computer system to the operational mode.

Step 518B: End.

According to the steps 500A-518A in the process 50, the application software may configure the ACPI and the USB driver to enable the S3 remote wakeup function. The S3 remote wakeup function is specified by the USB specification to allow the USB device (e.g. the USB dock station) to wake a host (e.g. the computer system) from a standby mode (e.g. the S3 mode). Then, the application software may determine whether the USB dock station is docked on the computer system by checking the specific VID/PID associated with the USB dock station. If no specific VID/PID associated with the USB dock is found, the application software may determine that no USB dock station is docked on the computer system. If the specific VID/PID associated with the USB dock station exists, the application software may keep monitoring the existence of the USB dock station. Once the USB dock station is undocked, the application software may start the timer and pop up the message window. If the user does not respond to the message window and disable the timer before it expires, the computer system may enter the power-saving mode.

According to the steps 500B-518B in the process 50, when the USB dock station is docked on the computer system operated in the power-saving mode, the USB dock station may detect if there is any USB activity on the D+ data line and the D– data line for over 15 ms. If the USB activity is found on the D+ data line and the D– data line, the USB dock station may determine the computer system is awake already and operated in an operational mode. If no USB activity has been found on the D+ data line and the D– data line within 15 ms, the USB dock station may perform state transition on the D+ data line and the D– data line. First of all, the USB dock station forces the D+ data line and the D– data line in the J state and then forces the D+ data line and the D– data line in the K state. The USB dock station holds the D+ data line and the D– data line in the K state for 20 ms. In the next step, the D+ data line and the D– data line turns to the no-force state. At the same time, the computer system is wakened up, and enters the operational mode.

To sum up, the USB dock station may cooperate with the application software to switch the computer system between the power-saving mode and the operational mode. In other words, if the computer system is operated in the operational mode, the application software allows the computer system to enter the power-saving mode automatically; if the computer system is operated in the power-saving mode, when the USB dock station is docked on the computer system, the USB dock station automatically wakes up the computer system back in the operational mode without any input from the user. Compared with the prior art, the examples of the present invention do not need any extra-hardware circuit to detect/generate sideband signals for a wake-up process. Thus, the complexity and cost can be dramatically reduced.

Those skilled in the art will readily observe that numerous modifications and alterations of the device and method may be made while retaining the teachings of the invention.

What is claimed is:

1. A power management method, the power management method comprising the steps of in the order named:
   a) a computer system checking existence of a manufacturing identifier (ID) of a human interface device (HID) when the computer system is operated in a first mode;
   b) the computer system continuously detecting whether the HID exist when the manufacturing ID exists;
   c) the computer system starting a timer when the computer system detects that the HID does not exist;
   d) the computer system entering a second mode when the timer expires;
   e) the HID determining whether the computer system is operated in the second mode, when plugged into the computer system;
   f) the HID performing state transition on the computer system when determining that the computer system is in the second mode; and
   g) the computer system entering the first mode when detecting the state transition.

2. The power management method of claim 1 further comprising the step of determining existence of the HID according to the manufacturing ID.

3. The power management method of claim 1, wherein the step of starting the timer when the HID no longer exists further comprises popping up a message window.

4. The power management method of claim 3 further comprising the step of disabling the timer according to a feedback signal of the message window.

5. The power management method of claim 1, wherein the step of determining whether the computer system is operated in the second mode when plugged into the computer system comprises determining the computer system is operated in the second mode when no bus activity has been detected on a data bus of the HID during a first predetermined time.

6. The power management method of claim 1, wherein the step of performing the state transition on the computer system when determining that the computer system is in the second mode comprises performing the state transition on the data bus connected to the computer system when no bus activity has been detected during the first predetermined time.

7. The power management method of claim 6, wherein the step of performing the state transition on the data bus connected to the computer system comprises:
   forcing the data bus into a J state of a universal serial bus (USB) protocol;
   forcing the data bus into a K state of the USB protocol;
   holding the data bus in the K state for a second predetermined time; and
   turning the data bus to a no-force state that triggers the computer system to enter the first mode.

8. The power management method of claim 1, the first mode is an operational mode and the second mode is a power-saving mode.

9. A power management method for a computer system, the power management method comprising the steps of in the order named:
   a) checking existence of a manufacturing identifier (ID) of a human interface device (HID) when the computer system is operated in a first mode;
   b) continuously detecting whether the HID exists when the manufacturing ID exists;
   c) starting a timer when detecting that the HID does not exist; and
   d) entering a second mode when the timer expires.

10. The power management method of claim 9 further comprising the step of determining existence of the HID according to the manufacturing ID.

11. The power management method of claim 9, wherein the step starting the timer when the HID no longer exists further comprises popping up a message window.

12. The power management method of claim 11 further comprising disabling the timer according to a feedback signal of the message window.

13. The power management method of claim 9, the first mode is an operational mode and the second mode is a power-saving mode.

\* \* \* \* \*